March 14, 1950  L. A. MAJNERI  2,500,555
VALVE ASSEMBLY
Filed March 26, 1945  4 Sheets-Sheet 1

FIG.1.

INVENTOR.
LUDWIG A. MAJNERI
BY
Whittemore, Hulbert & Belknap
ATTORNEYS

March 14, 1950　　　L. A. MAJNERI　　　2,500,555
VALVE ASSEMBLY

Filed March 26, 1945　　　　　　　　4 Sheets-Sheet 2

*INVENTOR.*
LUDWIG A. MAJNERI
BY
*Whittemore Hulbert & Belknap*
ATTORNEYS

March 14, 1950

L. A. MAJNERI

2,500,555

VALVE ASSEMBLY

Filed March 26, 1945

INVENTOR.
LUDWIG A. MAJNERI

BY

ATTORNEYS

Patented Mar. 14, 1950

2,500,555

UNITED STATES PATENT OFFICE 2,500,555

VALVE ASSEMBLY

Ludwig A. Majneri, Grosse Pointe, Mich., assignor to The Warner Aircraft Corporation, Detroit, Mich., a corporation of Michigan Application March 26, 1945, Serial No. 584,808

14 Claims. (Cl. 137—153)

This invention relates generally to valve assemblies and refers more particularly to improvements in power valves for hydraulic brake systems.

In certain hydraulic brake systems, it is customary to provide a power circuit and a control circuit. The power circuit usually comprises a brake having a hydraulic actuator and an accumulator containing fluid under relatively high pressure. The control circuit ordinarily embodies a manually operable pressure producing device in the form of a master cylinder and a reservoir for storing hydraulic fluid medium. The two circuits are frequently connected by a power valve which is initially operated by the manually operable device to connect the accumulator to the brake actuator for applying the brake. Inasmuch as the pressure in the accumulator is relatively high, the brake actuator is practically instantly operated to apply the brake regardless of the length of the line between the actuator and accumulator. In many installations, the accumulator pressure exceeds the desired brake applying pressure by a substantial amount and in order to maintain the pressure at the brake actuator within specified limits, the power valve control plunger in effect floats between a reservoir port and the port connected to the accumulator. In general, the arrangement is such that when the pressure at the actuator exceeds the desired brake applying pressure, the port communicating with the accumulator is closed and the actuator is connected to the reservoir to relieve the pressure in cases where the latter becomes too high. On the other hand, when the pressure at the actuator falls below the desired brake applying pressure, the accumulator is again connected to the brake actuator.

Power valves employed in the past for the above purpose have proved objectionable in some installations because of the tendency for the control plunger to flutter during operation and in some cases, the plunger flutters so violently that it effects proper control of the brake applying pressure. This vibration or fluttering of the valve member or control plunger is largely due to the dynamic component of the control pressure acting on one end of the valve member and is overcome to a great extent by so arranging the valve ports that fluid under pressure from the accumulator flows through the power valve to the brake actuator in directions at right angles to the direction of travel of the valve member. In detail, the valve member is provided with an annular groove in the outer surface thereof which, in one position of the valve member, registers with longitudinally spaced radial ports, respectively communicating with the accumulator and brake actuator. Thus, fluid under pressure from the accumulator enters the valve at right angles to the valve member and leaves the valve in a direction at right angles to the valve member.

Another object of this invention which contributes materially to stabilizing the action of the power valve is to provide a construction wherein the force opposing the control unit pressure and tending to move the valve member in a direction to connect the brake actuator to the reservoir comprises fluid under substantially static pressure. In accordance with one embodiment of this invention, the brake actuator communicates with the space in the power valve at the end of the valve member opposite the end exposed to the control unit pressure through a restricted port extending at right angles to the brake actuator port, so as to reduce the dynamic component of the fluid pressure admitted to the valve to a minimum.

The restricted orifice previously mentioned also serves to dampen movement of the valve member in the power valve and thereby assists in preventing vibration or fluttering of the valve member. However, this orifice will also function to introduce a time delay in the operation of the valve member to connect the accumulator to the brake actuator and in some installations, this delay may be somewhat longer than is desired. It is, therefore, a further object of this invention to provide a construction having means for controlling the orifice so that the latter does not materially restrict the rate of movement of the valve member to its brake applying position under the influence of the control unit pressure.

Still another object of this invention is to provide a power valve having cooperating means on the valve member and casing acting as a dash pot to dampen vibration of the valve member during operation of the power valve.

A further feature of this invention is to provide a power valve constructed in a manner to prevent leakage of fluid under pressure from the control circuit to the power circuit. This feature is especially advantageous in installations where the brake is held in its applied position for long periods since it prevents excessive loss of fluid from the control circuit during these periods.

The foregoing as well as other objects will be made more apparent as this description proceeds, especially when considered in connection with the accompanying drawings, wherein.

Figure 1:
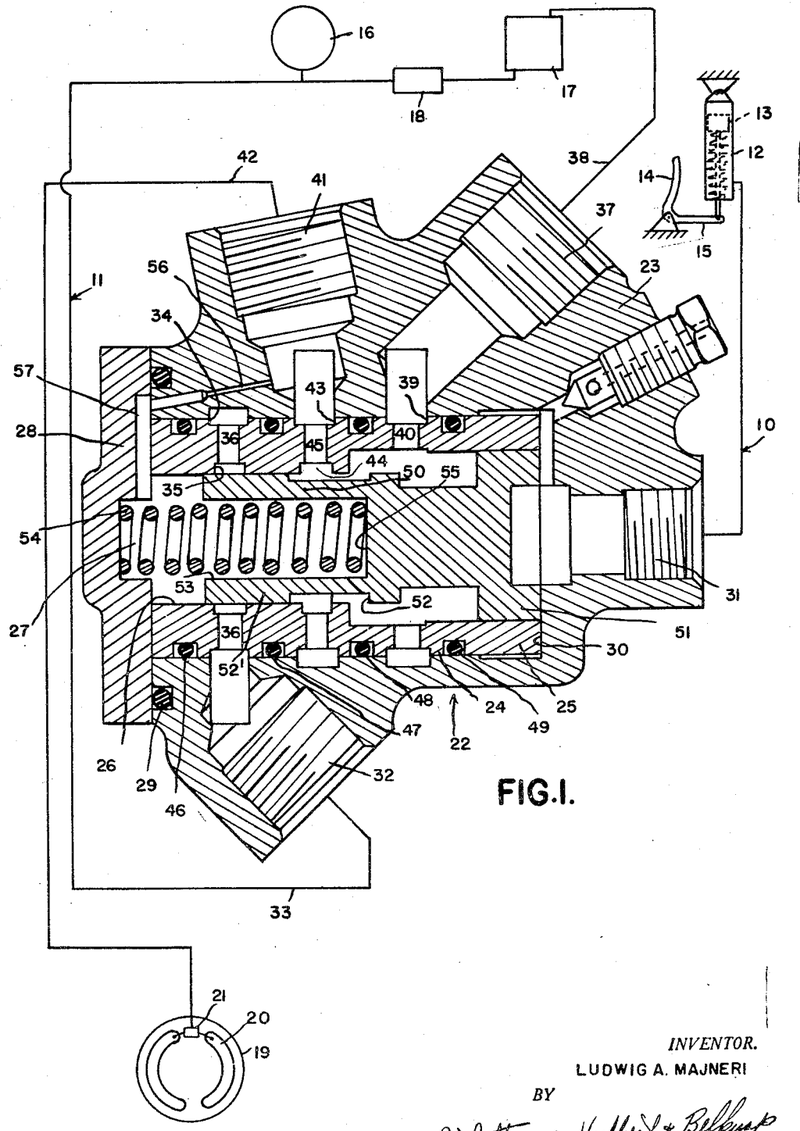
Figure 1 is a longitudinal sectional view through a valve assembly constructed in accordance with this invention and also diagrammatically indicates certain parts of a hydraulic braking system.

In Figure 1 of the drawings, I have illustrated a part of a hydraulic braking system comprising generally a control circuit 10 and a power circuit 11. The control circuit 10 embodies a manually operated pressure producing device 12 diagrammatically indicated in Figure 1 as a master cylinder having a piston 13 connected to a manually operated control 14 through linkage 15.

The power circuit 11 comprises an accumulator 16, a reservoir 17, connected to the accumulator through the medium of a pump 18, and a ground engaging wheel brake 19. The brake 19 may be any one of a number of orthodox designs having brake friction means 20 and a hydraulic actuator 21 for the brake friction means.

The accumulator 16 is adapted to contain a substantial supply of hydraulic fluid under relatively high pressure and is connected to the brake 19 by a valve assembly 22. The valve assembly 22 comprises a casing 23 having a bore 24 therethrough and having a sleeve 25 secured within the bore 24. The sleeve 25 forms a wear resisting liner for the bore and the internal diameter of the sleeve is predetermined to provide a cylindrical valve chamber 26. One end 27 of the bore 24 is open to enable the liner 25 to be sleeved into the bore and a cap 28 is secured to the adjacent wall of the casing 23 to close the end 27 of the bore. A suitable O-ring seal 29 surrounds the end 27 of the bore 24 between the cap 28 and adjacent wall of the casing 23 to prevent the escape of fluid from the bore. The opposite end of the bore 24 is closed by the adjacent end wall 30 of the casing 23 and the latter wall of the casing is formed with a port 31. The port 31 establishes communication between the valve chamber 26 and the lower end of the master cylinder 12 for reasons to be presently set forth.

The casing 23 is provided with a second port 32, which is connected to the accumulator 16 by means of a conduit 33 and communicates with an annular groove 34 formed in the periphery of the sleeve 25. The annular groove 34 communicates with a second annular groove 35 formed in the inner surface of the sleeve 25 through the medium of radially extending ports or passages 36.

The casing 23 is formed with a third port 37 which communicates with the reservoir 17 through the medium of a conduit 38 and also communicates with an annular groove 39 formed in the periphery of the sleeve 25 in longitudinal spaced relationship to the annular groove 34. The groove 39 communicates with the interior of the chamber 26 through the medium of radial passages 40.

A fourth port 41 is formed in the casing 23 and is adapted to be connected to the hydraulic brake actuator 21 by a conduit 42. The port 41 communicates with an annular groove 43 formed in the periphery of the sleeve 25 intermediate the grooves 34 and 39. The annular groove 43 communicates with an annular groove 44 formed in the inner surface of the sleeve 25 through the medium of radial passages 45.

Leakage of hydraulic fluid in an axial direction through the joint between the sleeve 25 and the bore 24 from one passage to another is prevented by suitable O-ring seals. As shown in Figure 1, an O-ring seal 46 is located around the sleeve 25 to prevent the escape of fluid from the annular groove 34 through the end 27 of the bar 24. A second O-ring seal 47 surrounds the sleeve 25 between the grooves 34 and 43 to prevent the escape of fluid from one groove to the other. A third O-ring seal 48 surrounds the sleeve 25 between the grooves 43 and 39 to prevent the escape of fluid from one groove to the other. A fourth O-ring seal 49 surrounds the sleeve 25 between the groove 39 and the adjacent end of the sleeve to prevent the escape of fluid from the groove 39 to the end of the chamber 26 adjacent the port 31.

Supported in the chamber 26 for sliding movement in opposite directions is a valve member 50 having a head 51 at the end thereof adjacent the port 31 and having an annular groove 52 intermediate the ends thereof. The end of the chamber 26 adjacent the port 31 is enlarged to slidably support the head 51 on the valve member. The engaging surfaces of the head and sleeve are preferably lapped to provide a fluid seal therebetween. However, instead of providing lapped surfaces, an O-ring seal may be employed to prevent the escape of fluid under pressure through the joint between the head 51 and the adjacent surface of the chamber 26.

The reduced end 52' of the valve member 50 is provided with a recess 53 and a spring 54 is positioned in the recess. One end of the spring abuts the end wall 55 of the recess 53 and the opposite end of the spring abuts the cap 28. The arrangement is such that the valve member is normally urged by the spring 54 in a direction toward the end wall 30 of the casing 23.

The valve member 50 is moved against the action of the spring 54 by manual operation of the control member 14, which moves the piston 13 downwardly in the master cylinder to supply fluid under pressure into the chamber 26 through the port 31. The length of the groove 52 is predetermined to connect the groove 44 with the reservoir port 37 when the valve member 50 is in its inoperative position shown in Figure 1 and to connect the groove 44 with the groove 35 when the valve member is moved by the master cylinder in a direction toward the cap 28. Thus, when the valve member is in its inoperative position, the brake actuator 21 is connected to the reservoir 17 through the port 37 and when the valve member is in its operative position, the brake actuator 21 is connected to the accumulator 16. As a result, fluid under relatively high pressure from the accumulator 16 is admitted to the brake actuator 21 to apply the brake friction means 20.

In connection with the above, attention is again called to the fact that the passages 36 and 45 extend radially with respect to the direction of movement of the valve member 50 in the chamber 26. Thus, when the valve member 50 is in a position wherein the groove 52 connects the passages 36 and 45, fluid under pressure flows through the passage 36 into the groove at right angles to the direction of movement of the valve member.

Also, fluid under pressure is compelled to leave the groove through the passage 45 at right angles to the direction of movement of the valve member 50. As a result of the foregoing, there is practically no force component exerted on the valve member by the fluid under pressure tending to move the valve member in either direction. This feature is of considerable importance in a valve assembly of the type described, because it tends to reduce fluttering of the valve member in the chamber 26 to a minimum.

Owing to the fact that the pressure in the accumulator 16 is usually considerably higher than the actual pressure required to operate the brake, it is desirable to control this pressure to maintain the latter below a predetermined critical value. For accomplishing this result, provision is made herein for communicating the substantially static pressure in the brake port 41 to the chamber 26 opposite the reduced end 52' of the valve member. As shown in Figure 1 of the drawings, a restricted passage 56 extends at right angles from the port 41 to a passage 57 formed in the cap 28 and communicating with the adjacent end of the chamber 26. Thus, fluid under pressure is permitted to flow from the brake port 41 at a reduced rate to the chamber 26 at the end 52' of the valve member 50 and this fluid is compelled to leave the port 41 at substantially right angles to the flow of fluid through this port. As a result, the pressure in the chamber 26 at the end 52' of the valve member may be considered as the static pressure of the fluid in the port 41, because it is not effected by the flow of the fluid through the port 41.

As the so-called static pressure in the chamber 26 at the end 52 of the valve member increases beyond the desired brake-applying pressure, the valve member is moved toward the wall 30 of the casing and closes the passages 36, which are connected to the accumulator 16. In the event the static pressure continues to rise, the valve member 50 moves in the above direction sufficiently to connect the passages 45 with the passages 40 through the groove 52 to permit fluid under pressure from the brake port 41 to escape into the reservoir 17. As soon as the pressure acting on the reduced end 52 of the valve drops below the predetermined critical value, the valve member 52 is again moved against the action of the spring 54 to close communication between the reservoir port 37 and the brake port 41. Thus the valve member 50, in effect, floats in the chamber to accurately control the pressure at the brake actuator 21.

It has been pointed out above that the passage 56 is restricted. The purpose of this restriction is to delay the pressure rise in the chamber 26 at the reduced end 52' of the valve member and thereby avoid premature movement of the valve member to connect the brake port 41 with the reservoir port 37. However, the restricted passage 56 also retards the flow of fluid from the chamber 26 to the brake port 41 when the valve member is moved against the action of the spring 54 by the master cylinder 12. It follows, therefore, that the diameter of the passage 56 must be proportioned to give the optimum valve action in either direction of movement of the valve member 50.

Attention is also called to the fact that the ratio between the diameter of the head 51 on the valve member 50 and the area of the reduced end 52' of the valve member is predetermined to afford the desired pressure differential between the control unit pressure and the brake applying pressure. In the present embodiment of the invention, the pressure of the fluid from the master cylinder 12 acts on a substantially greater area of the valve member than the brake applying pressure in the chamber 26 at the reduced end of the valve member. Accordingly, the pressure required to manually operate the valve member to apply the brake is correspondingly less than the actual brake applying pressure.

Figure 2:
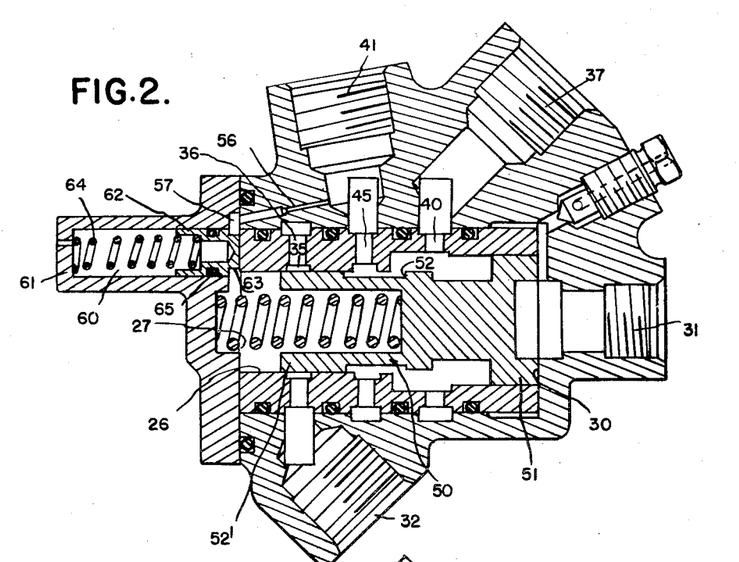
Figure 2 is a fragmentary sectional view of a valve assembly similar to Figure 1, showing a slightly modified form of construction.

Figure 2 of the drawings illustrates a valve assembly having provision for retarding the pressure rise in the chamber 26 at the reduced end 52' of the valve member 50. In detail, the cap closing the end 27 of the bore 24 is fashioned to form a chamber 60 having a vented wall 61 at one end and having the opposite end communicating with the passage 57. A plunger 62 is slidably supported in the chamber 60 and is provided with a reduced end 63 normally urged into abutting engagement with the adjacent end of the sleeve 25 by means of a spring 64. The spring 64 is arranged under compression between the plunger 62 and the wall 61 of the chamber 60. An O-ring 65 surrounds the plunger 62 intermediate the ends of the latter and engages the inner surface of the chamber 60 to prevent the escape of fluid under pressure around the plunger.

The displacement obtained by the available travel of the plunger 62 in the bore 60 is substantially greater than the displacement of fluid due to the travel of the valve member 50 from the released position shown in Figure 2 of the drawings to its brake applying position where the groove 52 connects the ports 32 and 41. Thus, it will be readily seen that for this part of the travel of the valve member 50, movement of the plunger is not dependent on the flow of fluid through the restricted orifice 56 into the port 41, but is restricted only by the very light spring 64 acting on the plunger 62. As soon as a pressure rise is obtained in the port 41, fluid under pressure will flow from the port 41 through the restricted passage 56 to the passage 57 and this flow will cause the plunger 62 to travel against the force of the light spring 64 until the end of the piston strikes the wall 61. After the above takes place, the pressure in the passage 57 rises above the value maintained by the spring 64 and causes the valve member 50 to move toward its brake releasing position.

The plunger 62 will also materially assist in releasing the brakes. For example, if at the instant when the pressure in the port 31 is released, the plunger 50 is in a position where the groove 52 is registering, or almost registering, with the groove 35, then the valve member 50 has to move a substantial distance before it can establish communication between the ports 41 and 37. With the plunger 62 provided, this movement of the valve member is not dependent on the additional fluid passing through the restricted passage 56, because fluid is readily supplied into the passage 57 by movement of the plunger 62 by the spring 64.

With the above exceptions, the construction is the same as the one shown in Figure 1 of the drawings and corresponding parts are indicated by the same reference characters.

Figure 3:
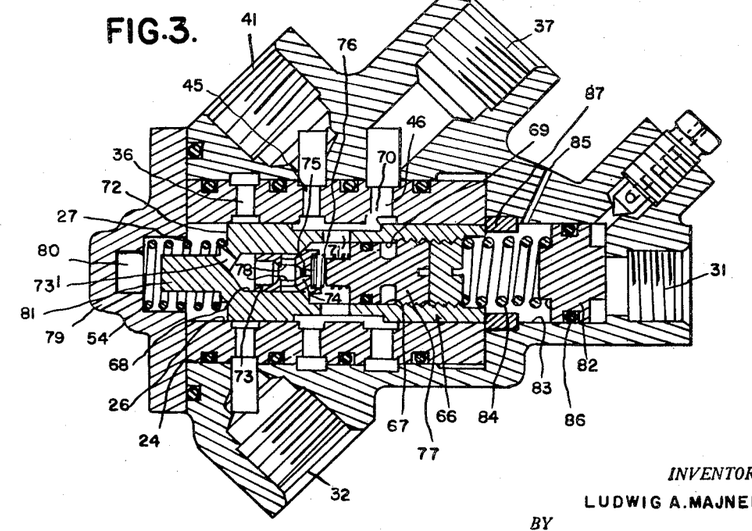
Figure 3 is a longitudinal sectional view through a modified construction of valve assembly.

The embodiment of the invention illustrated in Figure 3 of the drawings shows a valve assembly equipped with a somewhat different type of valve member. This valve member is indicated generally by the reference character 66 and the end portion of the latter adjacent to port 31 is axially bored to form a cylindrical chamber 67 having a reduced portion 68 adjacent the opposite end of the valve member. The enlarged portion 69 of the chamber 67 communicates with the annular groove 70 in the periphery of the valve member through the medium of radial ports 71. The groove 70 corresponds to the groove 52 in the valve member 50 of the first described form of this invention in that it alternatively connects the brake actuator port 41 to the accumulator and reservoir ports 32 and 37 respectively upon movement of the valve member 66 in opposite directions in the valve chamber 26.

The reduced portion 68 of the chamber 67 communicates with the chamber 26 at the end 72 of the valve member through a port 73'. Thus, it will be noted that the reduced portion 68 of the chamber 67 forms a passage between the ports 71 and 73' to enable fluid under pressure to flow from the brake port 41 to the chamber 26 at the end 72 of the valve member.

In the present instance, a differential flow of fluid in opposite directions through the passage 68 is obtained by providing a plunger 73 in the passage 68. The plunger 73 is provided with a head 74 having a conically shaped surface adapted to engage a correspondingly shaped seat surrounding the end of the passage 68 adjacent the ports 71. The head 74 is formed with an axially extending restricted port 75 which provides for permanent communication between the ports 71 and the port 73'. The plunger is normally urged to its closed position shown in Figure 3 of the drawings by a relatively weak coil spring 76 held under compression between the head 74 of the plunger and a plug 77 secured in the enlarged portion 69 of the valve chamber 67.

The above construction is such that when the valve member 66 is in its brake applying position wherein the groove 70 connects the ports 41 and 32, it will be noted that the plunger 73 is in its closed position with respect to the passage 68. However, fluid under pressure from the brake port 41 is permitted to flow through the ports 71 and through the restricted port 75 in the plunger to the chamber 26 at the end 72 of the valve member. The restricted port 75 is so arranged that the pressure communicated therethrough corresponds substantially to the static pressure at the brake port 41 to obtain the same results previously discussed in connection with the first described form of this invention. In the present instance, however, the port 75 may be restricted to obtain the desired delay in movement of the valve member toward its closed or inoperative position without regard to unduly retarding movement of the valve member to its open position. In this connection, it will be noted that as the valve member is moved from the position shown in Figure 3 to its open position against the action of the spring 54, fluid under pressure flows relatively freely through the port 73' and moves the plunger 73 to its open position. As shown, the plunger is axially bored and is provided with radial ports 78 intermediate its ends to facilitate the escape of fluid from the passage to the enlarged portion 69 of the chamber 67. It follows from the above that the plunger 73 is applicable in valve assemblies where it is desired to eliminate the time delay in applying the brake, which may result in the use of a fixed restricted passage between the brake port and the valve chamber.

The valve assembly shown in Figure 3 also differs from the previously described constructions in that provision is made for retarding or damping movement of the valve member to its brake applying position. In detail, it will be noted that the cap 79 for the end 27 of the bore 24 is provided with an axially extending chamber 80 for receiving a cylindrical projection 81 on the adjacent end of the valve member 66. The construction is such that the projection 81 enters the chamber 80 just prior to opening communication between the brake port 41 and the accumulator port 32. This feature tends to stabilize the action of the valve member and to prevent fluttering of the latter.

A further feature of the valve assembly shown in Figure 3 is that the valve member 66 is operated from the master cylinder 12 through a piston 82 slidably supported in an extension 83 of the chamber 26 and normally urged against the port 31 by a spring 84. The spring 84 is actually stronger than the spring 54, but in the "off" position shown in Figure 3 of the drawing is virtually free between the piston 82 and the adjacent end of the valve member 66. Thus, fluid under pressure from the master cylinder enters the port 31 and acts on the piston 82 to move the latter against the action of the spring 84 in a direction toward the valve member 66. The space between the piston 82 and the adjacent end of the valve member 66 is vented to the atmosphere by a passage 85 and an O-ring 86 surrounds the piston to prevent the escape of fluid from the port 31 past the piston. This construction is advantageous where it is desired to provide greater pedal travel during brake application than can be ordinarily obtained where the valve member is operated directly by the fluid under pressure from the master cylinder. Moreover, by providing a fixed stop 87 for the piston 82, it is possible to limit the amount of pressure applied to the valve member 66 and this is especially advantageous in installations (not shown) wherein the accumulator may be selectively connected to the port 31 for parking purposes.

With the above exceptions, the valve assembly shown in Figure 3 operates in substantially the same manner as the valve assembly shown in Figure 1 of the drawings. Therefore, corresponding parts of the two embodiments are indicated by the same reference characters.

Figure 4:
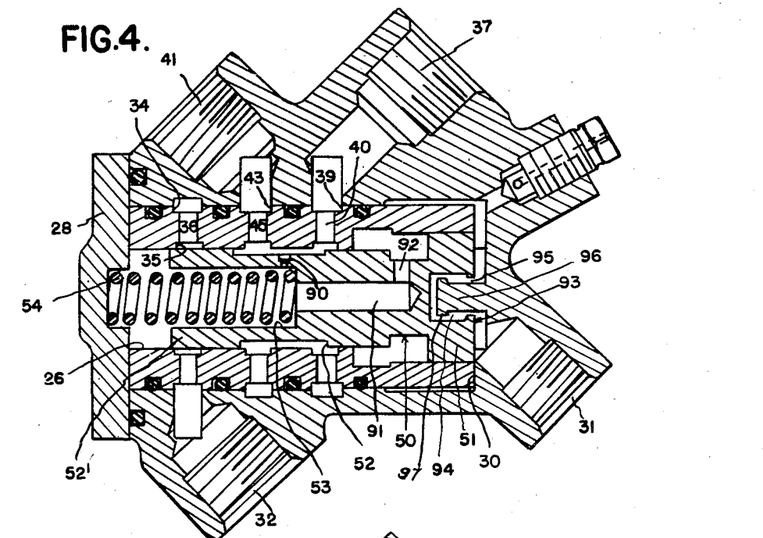
Figure 4 is a longitudinal sectional view through another modified valve assembly.

In the embodiment of the invention shown in Figure 4 of the drawings, the brake port 41 communicates with the chamber 26 at the reduced end 52' of the valve member through a restricted port 90. The restricted port 90 connects the annular groove 52 in the periphery of the valve member to the axially extending bore 53 in the valve member. This bore is open at the reduced end 52' of the valve member and, in the present instance, is provided with an extension 91, which communicates with the chamber 26 through a port 92. The port 92 is positioned at the inner side of the head 51 on the valve member 50 so that the fluid pressure admitted through the port 90 acts upon an area of the valve member which is equal to the area of the valve member exposed to the master cylinder 12. Thus, the same pressure is provided at opposite ends of the valve member during brake application and leakage past the head 51 of the valve member in instances of prolonged brake application is prevented.

In the valve assembly shown in Figure 4 of the drawings, movement of the valve member 50 to its brake applying position is retarded by a dashpot arrangement indicated generally by the reference character 93. In detail, the head 51 of the valve member is formed with a chamber 94 having a restricted opening 95 at the side of the head adjacent the port 31. A projection 96 is formed on the adjacent wall of the casing and extends into the chamber 94. The free end of the projection is formed with a head 97 which corresponds in diameter to the internal diameter of the restricted opening 95, so that as the head 97 approaches the restricted opening, a damping action is imparted to the valve member 50.

With the above exceptions, the valve assembly shown in Figure 4 is the same as the one shown in Figure 1 and corresponding parts are, therefore, indicated by the same reference numerals.

Figure 5:
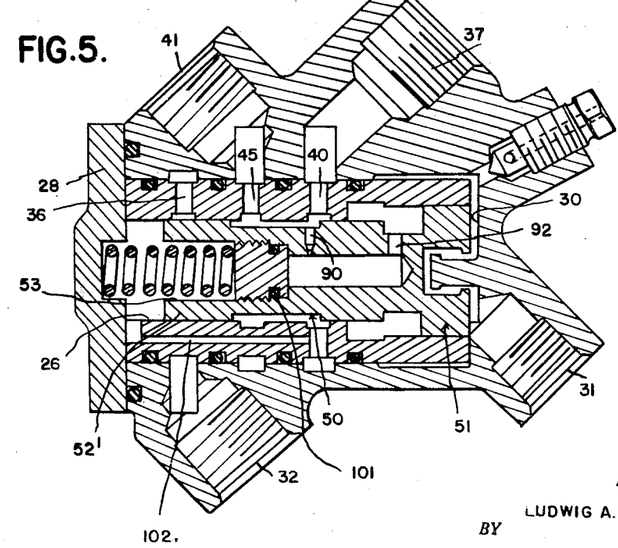
Figure 5 is a longitudinal sectional view through a valve assembly showing still a further modification of this invention.

The modification shown in Figure 5 of the drawings differs from the one previously described in that communication between the restricted port 90 and the end of the chamber 26 opposite the reduced end 52 of the valve member 50 is prevented by a plug 100 secured in the bore 53 of the valve member 50 and having an O-ring seal 101 to prevent the escape of fluid around the same. Thus, fluid under pressure from the restricted port 90 is compelled to flow through the port 92 into the valve chamber 26 and acts on the inner face of the head 51 tending to move the valve member to the position thereof shown in Figure 5. Also the reservoir 17 is connected to the chamber 26 at the reduced end 52' of the valve member 50 by a passage 102. Thus, during brake application, the pressure in the chamber 26 at the inner face of the head 51 of the valve member 52' is greater than the pressure applied to the outer face of the head 51 of the valve member by the master cylinder 12. This is particularly desirable in cases where the valve member is held in its brake applying position for substantial periods of time, because any leakage past the head 51 will take place from the power circuit to the control circuit where the excess fluid may be readily drained off. With the above exceptions, the embodiment of the invention shown in Figure 5 of the drawings is the same as the construction illustrated in Figure 4 and, accordingly, corresponding parts are indicated by the same reference characters.

Figure 6:
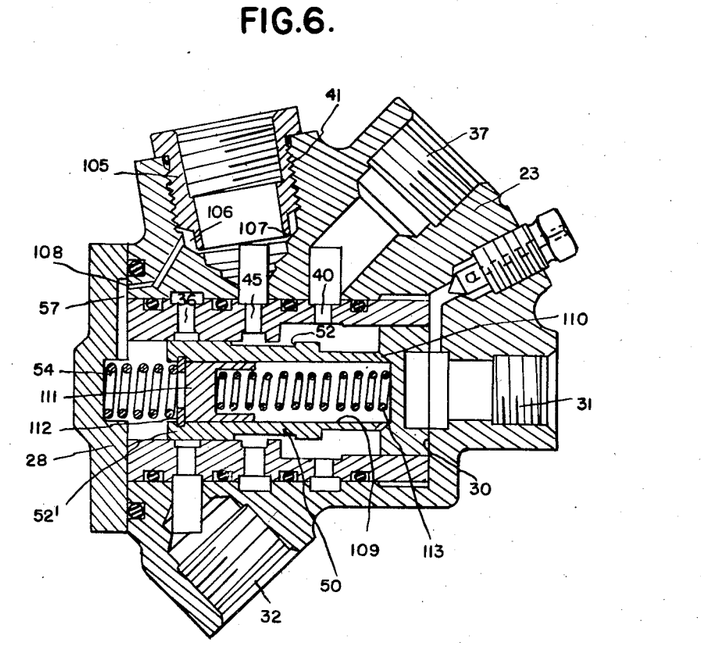
Figure 6 is a sectional view through still another embodiment of this invention.

Figure 6 of the drawings illustrates a valve assembly similar in many respects to the embodiments of the invention shown in Figures 1 and 2 of the drawings. However, Figure 6 of the drawings features a somewhat different arrangement for communicating the substantially static pressure of the hydraulic brake fluid in the brake actuator passage 41 to the chamber 26 at the reduced end 52' of the valve member 50. Also, Figure 6 of the drawings illustrates a slightly different form of displacement device than is shown in Figure 2 of the drawings.

In detail, the port 42 through the valve casing 23 is provided with a bushing 105 having the inner end reduced to form an annular chamber 106, which communicates with the radial passage 45 through the medium of a restricted annular passage 107. The annular chamber 106 is connected to the passage 57 by means of a restricted port 108 and the passage 57 communicates with the valve chamber 26 at the reduced end 52' of the valve member 50. In some installations, the above construction may be preferred, because it insures transmitting fluid from the brake actuator port 42 to the valve chamber in such a manner that the pressure of this fluid is not effected by turbulence of the fluid under pressure flowing into the port 42 from the passage 45. In other words, fluid under pressure entering the restricted port 108 is compelled to flow through the restricted annular passage 107 from the port 42 and any turbulence existing would have a negligible effect on the pressure of the fluid in the chamber 106.

It will also be noted from Figure 6 of the drawings that the valve member 50 is axially bored to form a chamber 109 having the end adjacent the cap 28 open and having the opposite end closed by the head 51 on the valve member, except for a small vent 110, which communicates with the reservoir port 37. A plunger 111 is slidably mounted in the chamber 109 and is normally urged into engagement with the split ring 112 by a compression spring 113. The ring 112 is suitably secured in the chamber 109 adjacent the open end of the latter and also forms an abutment for the return spring 54.

Assuming that the valve member 50 is in the position thereof shown in Figure 6 of the drawings, and that fluid under pressure is admitted through the port 31, it will be noted that the valve member 50 is moved in the chamber 26 toward its brake applying position. As the valve member 50 moves in the above direction, the pressure of the fluid in the chamber 26 at the reduced end 52' of the valve member acts on the plunger 111 and moves the plunger against the action of the spring 113. However, the construction is such that the plunger does not move to the limit of its travel by the spring 113 until the passage 45 is connected to the accumulator passage 36 through the annular groove 52. When this condition exists, fluid under pressure is transferred from this brake actuator port 42 through the restricted passage 108 to the chamber 26 at the reduced end 52' of the valve member. This pressure rise in the chamber 26 effects a continuation of the movement of the plunger 111 against the action of the spring 113 to increase the volume of the portion of the chamber 109 connected to the valve chamber 26. Thus, the chamber 109 and plunger 111 form a displacement device, which delays movement of the valve member 50 in a direction toward its brake releasing position.

While a number of constructions are shown herein for the purpose of illustrating the present invention, nevertheless, each embodiment features a valve assembly wherein fluid under pressure flows to and from the valve in such a manner that no force components are created tending to move the valve member in either of its two directions of movement. It will further be noted that in each modification, provision is made for communicating the substantially static pressure at the brake actuator to the valve chamber for building up sufficient pressure in the latter to move the valve member toward its brake releasing position. Both of these features are highly desirable in that they cooperate in reducing the tendency for the valve member to vibrate or flutter during operation.

What I claim as my invention is:

1. A valve assembly for hydraulic brake systems having a chamber, a first port in said chamber, a second port in the chamber spaced longitudinally from the first port, a third port spaced from both the above ports, a valve member slidable in the chamber and having an annular groove in the periphery thereof alternatively connecting the second port to the first and third ports upon movement of the valve member in opposite directions, said valve member having a surface against which fluid under pressure admitted to the chamber is adapted to act, and a restricted passage connecting the second port to the chamber at one side of said surface for admitting fluid under pressure to move the valve member in a direction to close communication between the first and second ports, the diameter of the restricted passage being so proportioned with respect to the diameter of the second port to insure a substantial delay in the pressure rise in said chamber at the side aforesaid of the valve surface.

2. A valve assembly for hydraulic brake systems having a cylindrical chamber, a first port extending radially outwardly from the chamber, a second port spaced longitudinally from the first port and extending radially outwardly from the chamber, a third port spaced from both the above ports, a piston type valve member slidable in the chamber and having an annular groove in the periphery thereof alternatively connecting the second port to the first and third ports upon movement of the valve member in opposite directions, a fourth port in the valve chamber for supplying fluid under pressure to the chamber at one end of the valve member to move the latter in a direction to connect the second port to the first port through said annular groove, and means for communicating the substantially static pressure of the fluid in the second port to the chamber at the opposite end of the valve member to urge the latter in a direction to connect the second and third ports through said annular groove.

3. A valve assembly for hydraulic brake systems having a cylindrical chamber, a first port extending radially outwardly from the chamber, a second port spaced longitudinally from the first port and extending radially outwardly from the chamber, a third port spaced from both the above ports, a piston type valve member slidable in the chamber and having an annular groove in the periphery thereof alternatively connecting the second port to the first and third ports upon movement of the valve member in opposite directions, a fourth port in the valve chamber for supplying fluid under pressure to the chamber at one end of the valve member to move the latter in a direction to connect the second port to the first port through said annular groove, and a restricted passage connecting the second port to the chamber at the opposite end of the valve member and arranged to transfer the substantially static pressure of the fluid in the second passage to the chamber at the last named end of said valve member.

4. A valve assembly for hydraulic brake systems having a cylindrical chamber, a port in said chamber, a second port in said chamber, a third port in the chamber, a valve member slidably supported in the chamber for alternatively connecting the third port to the first and second ports upon movement of the valve member in opposite directions, said valve member having axially spaced surfaces against which fluid under pressure is adapted to act, a fourth port communicating with the chamber at one side of one of said surfaces on the valve member for admitting fluid under pressure to move the latter in a direction to connect the first and third ports, and a restricted passage arranged to communicate the substantially static pressure of the fluid in the third port to the chamber at the side of the other surface on the valve member to move the latter in a direction to close communication between the first and third ports.

5. A valve assembly for hydraulic brake systems comprising a casing having a cylindrical chamber provided with an enlargement at one end, a pair of longitudinally spaced ports in the casing, a port intermediate the ports aforesaid, a valve member supported in the chamber for sliding movement and having an annular elongated groove in the periphery alternatively connecting the intermediate port to the end ports upon movement of the valve member in opposite directions in the chamber, axially spaced portions on the valve member against which fluid under pressure is adapted to act to impart movement to the valve member, one of said portions presenting a larger area to fluid under pressure than the other and being located in the enlargement of the chamber, an axial passage in the valve member communicating with the chamber at the inner side of said one portion and communicating with the chamber beyond the other portion on the valve member, and a restricted passage extending substantially radially from the axial passage to said annular groove in the periphery of the valve member.

6. A valve assembly for hydraulic brake systems, comprising a chamber, a valve member of the piston type slidably supported in the chamber and having axially spaced surfaces presenting different areas against which fluid under pressure is adapted to act, a port in the chamber positioned to supply fluid under pressure to the chamber against the valve surface of reduced area, a second port in the chamber spaced from the first port, a third port in the chamber, a fourth port in said chamber positioned to introduce fluid under pressure into the chamber against the surface of enlarged area on the valve member, means associated with the valve member for alternatively connecting the third port to the first and second ports upon movement of the valve member in opposite directions, and a restricted passage arranged to communicate the substantially static pressure of the fluid in the third port to the chamber adjacent the surface of reduced area on the valve member to move the latter in a direction to close communication between the first and third ports.

7. A valve assembly for hydraulic brake systems, comprising a chamber, a piston type valve member supported in the chamber for sliding movement and having axially spaced surfaces against which fluid pressure may act, a port in said chamber positioned to supply fluid to said chamber adjacent one of the surfaces on the valve member, second and third ports in said chamber, a fourth port in said chamber located to supply fluid under pressure to the chamber adjacent the other surface on said valve member, means associated with the valve member for alternatively connecting the third port to the first and second ports in response to movement of the valve member in opposite directions in the chamber, and means operating in timed relation to movement of the valve member in a direction to connect the first and third ports to dampen continued movement of the valve member in said latter direction.

8. A valve assembly for hydraulic brake systems, comprising a chamber, first and second ports in the chamber, a third port spaced from both the above ports, a fourth port in the chamber, a valve member slidable in the chamber and having means for alternatively connecting the second port to the first and third ports in response to movement of the valve member in opposite directions, a surface on the valve member adapted to be acted upon by the fluid under pressure admitted to the chamber through the first port for moving the valve member in a direction to connect the second port to the third port, another surface on the valve member adapted to be acted upon by the fluid admitted to the chamber through the fourth port to move the valve member in the opposite direction to connect the first port to the second port, means for communicating the substantially static pressure of the fluid in the second port to the chamber adjacent the first mentioned surface on the valve member tending to move the valve member in a direction to connect the second and third ports, and means responsive to movement of the valve member in the opposite direction to retard continued movement of the said valve member in the latter direction.

9. A valve assembly for hydraulic brake systems, comprising a casing having a chamber, longitudinally spaced first and second ports in the chamber, a third port in the chamber intermediate the ports aforesaid, a fourth port in the chamber, a valve member supported in the chamber for sliding movement and having an annular elongated groove in the periphery thereof responsive to movement of the valve member in opposite directions to alternatively connect the third port to the first and second ports, axially spaced surfaces on the valve member adapted to be respectively acted upon by fluid under pressure admitted to the chamber through the first and fourth ports, a third surface on the valve member against which pressure is adapted to be applied and located intermediate the above surfaces, and a fluid passage in the valve member communicating with the chamber adjacent the intermediate surface and having a restricted communication with the annular groove in said valve member.

10. A valve assembly for hydraulic brake systems comprising a casing having a cylindrical chamber provided with an enlargement at one end, a pair of first and second longitudinally spaced ports in the casing, a third port intermediate the ports aforesaid, a valve member supported in the chamber for sliding movement and having an annular elongated groove in the periphery alternatively connecting the intermediate port to the end ports upon movement of the valve member in opposite directions in the chamber, a surface on the valve member adapted to be acted upon by fluid under pressure admitted to the chamber through the first port to move the valve member in a direction to connect the second port to the third port, an enlargement on the valve member slidable in the enlarged end of the chamber, a fourth port in the chamber positioned to supply fluid under pressure to the chamber at the outer side of the enlargement to move the valve member in a direction to connect the first and second ports, an axial passage in the valve member communicating with the chamber at the inner side of the enlargement, and a restricted passage extending outwardly from the axial passage to said annular groove in the periphery of the valve member.

11. A valve assembly for hydraulic brake systems, comprising a casing having a chamber, first and second ports in said chamber, third and fourth ports in said chamber predeterminedly arranged with respect to one another and with respect to the first and second ports, a valve member slidably supported in the chamber and having means for alternatively connecting the third port to the first and second ports upon movement of the valve member in opposite directions, a surface on the valve member adapted to be acted upon by fluid pressure admitted to the chamber through the first port for moving said valve member in a direction to close the first port and to connect the second and third ports, a second surface on the valve member adapted to be acted upon by fluid pressure admitted to the chamber through the fourth port for moving the valve member in a direction to close the second port and to connect the first and third ports, means for communicating the substantially static pressure of the fluid in the second port to the chamber adjacent the first mentioned surface on the valve member tending to move the valve member in a direction to connect the second and third ports, and means responsive to movement of the valve member in the opposite direction to retard continued movement of the said valve member in the latter direction.

12. A valve assembly for hydraulic brake systems, comprising a casing provided with a chamber having first, second, third and fourth ports predeterminedly arranged with respect to one another, a valve member slidably supported in the chamber and having means for alternatively connecting the third port to the first and second ports upon movement of the valve member in opposite directions, a surface on the valve member adapted to be acted upon by fluid pressure admitted to the chamber through the first port for moving said valve member in a direction to close the first port and to connect the second and third ports, a second surface on the valve member adapted to be acted upon by fluid pressure admitted to the chamber through the fourth port for moving the valve member in a direction to close the second port and to connect the first and third ports, means for communicating the substantially static pressure of the fluid in the third port to the chamber adjacent the first surface, and means carried by the valve member and operated by fluid pressure admitted to the chamber by the last named means to delay movement of the valve member in a direction to close communication between the first and third ports.

13. A valve assembly for hydraulic brake systems, comprising a casing provided with a chamber having first, second, third and fourth ports predeterminedly arranged with respect to one another, a valve member slidably supported in the chamber and having means for alternatively connecting the third port to the first and second ports upon movement of the valve member in opposite directions, a surface on the valve member adapted to be acted upon by fluid pressure admitted to the chamber through the first port for moving said valve member in a direction to close the first port and to connect the second and third ports, a second surface on the valve member adapted to be acted upon by fluid pressure admitted to the chamber through the fourth port for moving the valve member in a direction to close the second port and to connect the first and third ports, a chamber connected to the third port for receiving fluid under pressure from the latter, and a passage connecting the last named chamber to the first mentioned chamber adjacent the surface on the valve member acted upon by fluid under pressure admitted to the chamber through the first port.

14. A valve assembly for hydraulic brake systems, comprising a casing provided with a chamber having first, second, third and fourth ports predeterminedly arranged with respect to one another, a valve member slidably supported in the chamber and having means for alternatively connecting the third port to the first and second ports upon movement of the valve member in opposite directions, a surface on the valve member adapted to be acted upon by fluid pressure admitted to the chamber through the first port for moving said valve member in a direction to close the first port and to connect the second and third ports, a second surface on the valve member adapted to be acted upon by fluid pressure admitted to the chamber through the fourth port for moving the valve member in a direction to close the second port and to connect the first and third ports, an annular chamber surrounding the third port and having a restricted communication with the latter, and a restricted passage connecting the annular chamber to the valve chamber adjacent the first mentioned surface on the valve member.

LUDWIG A. MAJNERI.

REFERENCES CITED

The following references are of record in the file of this patent:

UNITED STATES PATENTS

| Number | Name | Date |
|---|---|---|
| 558,034 | Brown | Apr. 14, 1896 |
| 1,579,940 | Iverson | Apr. 6, 1926 |
| 1,962,857 | Cash | June 12, 1934 |
| 2,009,515 | Pardee | July 30, 1935 |
| 2,057,132 | Besler | Oct. 13, 1936 |
| 2,061,120 | Vorech | Nov. 17, 1936 |
| 2,137,954 | Sanford | Nov. 22, 1938 |
| 2,167,328 | Beggs | July 25, 1939 |
| 2,210,917 | Kenyon | Aug. 13, 1940 |
| 2,260,490 | Stelzer | Oct. 28, 1941 |
| 2,282,472 | Herman | May 12, 1942 |
| 2,286,027 | Towler | June 9, 1942 |
| 2,306,346 | Rockwell | Dec. 22, 1942 |
| 2,411,930 | Mathys | Dec. 3, 1946 |

FOREIGN PATENTS

| Number | Country | Date |
|---|---|---|
| 598,690 | Germany | June 15, 1934 |
| 777,932 | France | Dec. 15, 1934 |